UNITED STATES PATENT OFFICE.

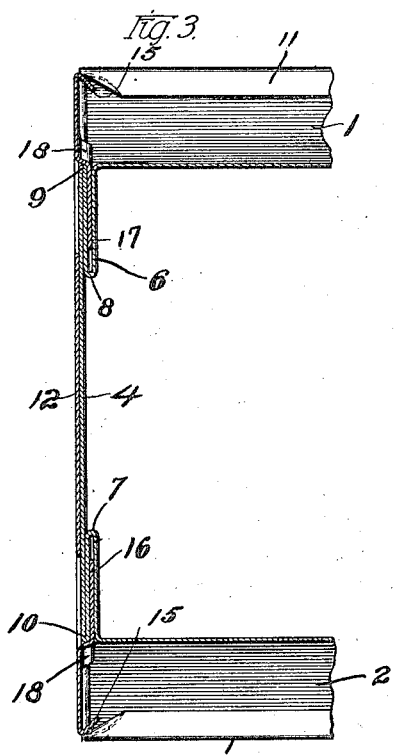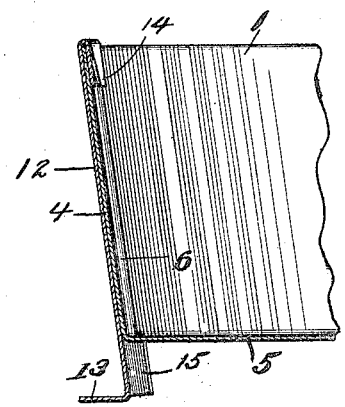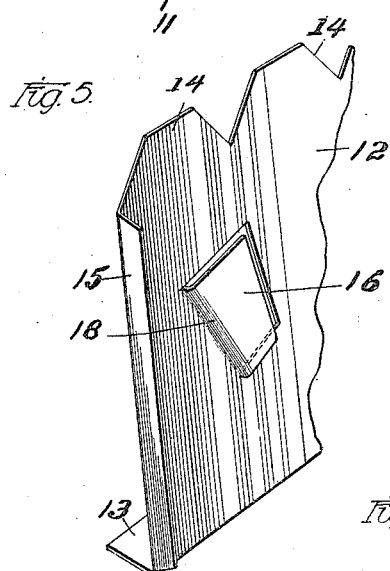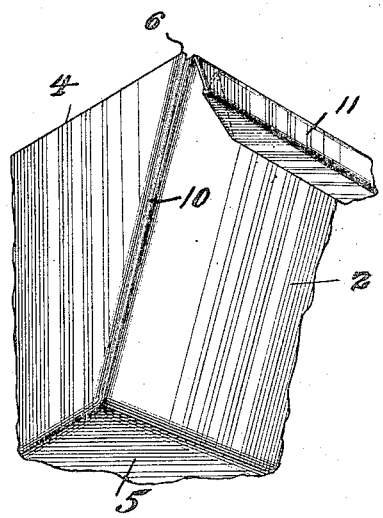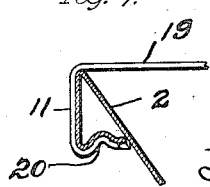

CARL G. NAYLOR AND GEORGE F. HAUF, OF CHICAGO, ILLINOIS, ASSIGNORS TO ROBERTSON BROTHERS MANUFACTURING COMPANY, OF CHICAGO, ILLINOIS, A CORPORATION OF ILLINOIS.

TROUGH.

1,424,371.  Specification of Letters Patent.  Patented Aug. 1, 1922.

Application filed March 6, 1919. Serial No. 281,022.

*To all whom it may concern:*

Be it known that we, CARL G. NAYLOR and GEORGE F. HAUF, citizens of the United States all respectively residing at Chicago, in the county of Cook and State of Illinois, have invented certain new and useful Improvements in Troughs, of which the following is a specification.

This invention relates to troughs.

It relates more particularly to feed and water troughs composed entirely of sheet metal.

An object of the invention is to provide a feed and water trough which may be shipped in knock-down form and readily set up by an unskilled person without the use of special tools.

Another object is to provide a trough which may be stored or shipped, nested in compact bundles.

Another object is to provide a trough wherein the support may be attached without necessitating the penetration of the walls or the use of extraneous fasteners such as bolts, screws, rivets, and the like.

Another object is to provide a serviceable, strong, simple and relatively inexpensive trough.

Another object is to provide a trough body which is free from joints.

Other objects and advantages will hereinafter appear.

The trough, in general, comprehends a body or receptacle having converging side and end walls made from a single piece of sheet metal which is formed with open end folds, and a support which interlocks with the body to carry the same.

An embodiment of the invention is illustrated in the accompanying drawings, wherein:—

Fig. 3 is a fragmentary section taken on line 3—3 of Fig. 2.

Fig. 4 is a fragment of a longitudinal section taken on line 4—4 of Fig. 2.

Fig. 5 is a broken away part of one of the detached ends of the trough.

Fig. 6 is a perspective view of a part of one of the outside corners of the trough.

Fig. 7 is a section taken on line 7—7 of Fig. 1.

Figure 1:
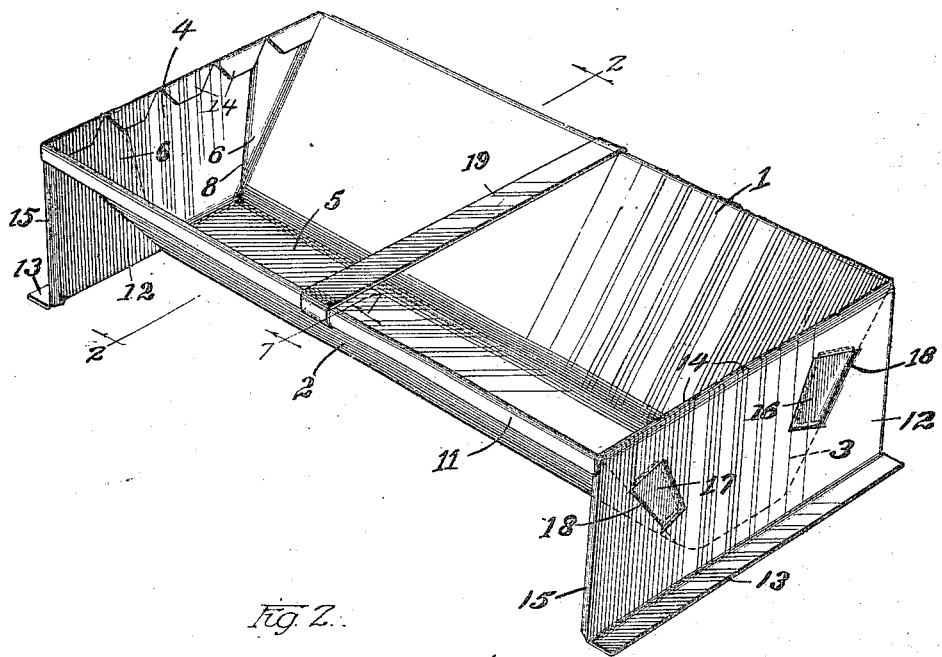
Fig. 1 is a perspective view of the trough showing the assembled parts in place.

The trough body has two downwardly converging side walls 1 and 2, two downwardly converging end walls 3 and 4 and a bottom 5. The entire body is made from a single piece of sheet metal.

Each end of the trough body is formed by turning the end of the sheet inwardly, or toward the open top of the trough, and interfolding the surplus metal to form two opposite or confronting complementary open tapering Z folds 6. Throughout each folded area the end of the body has three thicknesses of metal and the folds taper outwardly from the bottom. Thus the two folds at each end present confronting inclined edges 7 and 8 and external complementary edges 9 and 10. These open folds are utilized in the securing together of the body and supports and the fold edges assist in transferring the load of the trough body and its contents to the supports, as will be hereinafter described.

Each longitudinal edge of the trough is bent over to form a triangular flange or bead 11. These beads provide smooth rims for the trough, avoiding raw or rough edges which might injure the feeding animals.

Each end of the trough is carried by a support 12 in the form of a sheet metal panel. Each support or panel is provided with an outwardly extending flange 13 at its bottom to serve as a foot or rest for the trough. The upper edges of the supports, before the troughs are completely assembled, project above the upper edges of the corresponding ends of the trough body. These extending edges of the supports may be formed into tongues 14 to facilitate the subsequent bending over thereof. These tongues may be bent over the upper edges of the body ends, as will be hereinafter described, to assist in securely locking the trough body and supports together and to provide smooth rims for the ends of the trough. The opposite side edges of each support panel are formed into inturned flanges or side members 15, the upper ends of which extend under and interlock with beads 11 on the rim of the trough body, as clearly shown in Fig. 1.

Each end panel or support is provided with a pair of tongues or ears 16 and 17, lying approximately parallel with the panel. These tongues are formed integrally with the panel by cutting the panel and striking up the metal within the confines of the cuts. The metal on the uncut sides or bases of the tongues, that is, the metal which unites tongues and panel, when the tongues are thus struck up out of the plane of the panel, form inclined ledges 18 for abutting the inclined edges of the open folds in the body ends.

Figure 2:
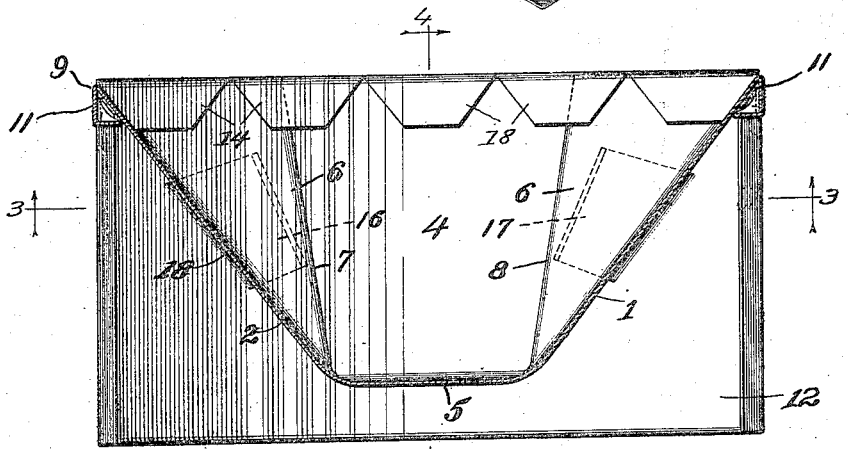
Fig. 2 is a transverse section taken on line 2—2 of Fig. 1.

To assemble the trough the tongues of the support are inserted behind the complementary open folds of the trough body. The body and support are then forced together, by a relative sliding movement, until the edges of the body folds abut the inclined ledges at the bases of the tongues. In this condition the side flanges 15 of the panel come under the ends of the rim beads 11 of the body. To lock the body and support securely together tongues 14 along the top edges of the supports are turned over and bent down on the inside of the respective ends of the trough, as shown in Figs. 1 and 2, preventing relative movement between the body and supporting panels and thus securely locking the same together.

The interlocking of the tongues and inwardly projecting flanges of the end panels and the folds, beads and top edges of the trough body securely lock the body and supports together and the body is carried by the supports.

If it is desired to strengthen the trough intermediate its ends a cross brace 19 may be provided. The ends of this brace are clamped over the substantially closed rim beads 11 of the body as most clearly shown in Figs. 1 and 7. After each end of the brace is set over the respective bead the end thereof may be struck with a hammer or other instrument to produce a small interlocking fold 20. These folds or indentations interlock the brace and the beads and prevent the brace from being moved longitudinally of the trough or removed therefrom. Such a brace prevents bulging of the trough body.

The trough bodies may be nested, and the bodies and supports stored or shipped in small compass. The bodies are free from joints which are relatively expensive to make and are liable to leak. The bodies and their supports, or the complete troughs, may be quickly and easily assembled without special tools or extraneous fasteners and the bodies remain unperforated so that the troughs are especially well adapted for liquids.

Having described our invention, what we claim is:—

1. A feed trough made of a single piece of sheet metal having outwardly flaring side walls, and end walls interfolded to provide outwardly open spaces between adjacent folds and end pieces, to provide bases for the trough, having inwardly extending ears for insertion within said spaces and having a part to fold over the upper edge of the end wall of the trough when the end pieces are in place.

2. A feed trough made of a single piece of sheet metal having end walls interfolded to provide three walls at the folds; attachable end pieces, each having a base flange and two side flanges and having two inwardly projecting ears for insertion between the respective folds and with an end projecting above the upper edge of the trough end, adapted to be bent down over the interfolded part of the trough end to hold the end piece in place.

3. A sheet metal trough having downwardly converging side walls and end walls each integrally formed with the side walls of the trough, the metal at the corners between the side walls and each end wall being formed into downwardly tapering Z-folds; in combination with a trough support at each end wall of the trough, each support having a portion held between adjacent layers of a Z-fold without penetrating the metal of the fold or the trough.

4. A trough structure comprising a sheet metal trough body having integral ends, each formed with a plurality of external folds lying adjacent to the end walls of the trough, and vertical supports for the end walls of the trough, each support having means rigid therewith and projecting therefrom between the folds and the adjacent end of the trough without penetrating the metal of the folds or the trough.

5. A trough structure comprising a sheet metal trough body having integral ends each formed with a plurality of external folds lying adjacent to the end walls of the trough, the edge formed at the junction of the adjacent members of the fold being inclined, relative to the vertcal, and vertical supports for the end walls of the trough, each support having means rigid therewith and projecting therefrom between the folds and the adjacent end of the trough without penetrating the metal of the folds or the trough; the inclined edge of the fold contacting with and pressing downward on the point of contact between the support and the projecting means to prevent movement of the trough downwardly relative to the support.

6. A sheet metal trough structure comprising a trough body having integral ends formed with external open folds presenting inclined confronting edges, supports detachably connected to said ends, each having lateral inwardly directed side members adapted for interlocking with the trough body, and means carried by said supports adapted to be received behind said folds.

7. A receptacle formed of sheet metal and having side walls and end walls integral with the side walls, the metal of the receptacle having folds formed therein at each corner of the receptacle; in combination with a trough support at each end of the receptacle, each support having a portion held between adjacent layers of each adjacent fold without penetrating the metal of the folds or the trough.

8. A receptacle formed of sheet metal and having side walls and an end wall integral with the side walls, the metal of the receptacle having a fold formed therein; in combination with a support for the receptacle having a portion held between adjacent layers of said fold without penetrating the metal of the fold or the trough.

9. A sheet metal trough comprising a trough body having integral ends formed with external open folds presenting inclined complementary edges, and supports detachably connected to said ends each support consisting of a panel provided with struck-up means interlocked with the folds of the adjacent end of the trough body.

10. A sheet metal trough comprising a trough body having integral ends formed with external open folds presenting inclined complementary edges, and supports detachably connected to said ends each support consisting of a substantially upright sheet metal panel having lateral inwardly directed side members adapted for interlocking with the trough body, and means struck up from said panel adapted for reception behind the confronting edges of said folds.

11. A sheet metal trough comprising a trough body having integral ends formed with external open folds presenting inclined complementary edges, and supports detachably connected to said ends each consisting of a substantially upright sheet metal panel having lateral inwardly directed side members adapted for interlocking with the trough body, and an inturned struck-up tongue formed on said panel and adapted to be received behind said folds.

12. A sheet metal trough comprising a trough body having integral ends formed with external open folds presenting inclined complementary edges, and supports detachably connected to said ends each consisting of a substantially upright sheet metal panel having lateral inwardly directed side members adapted for interlocking with the trough body, and means carried by said panel disposed in interlocking relation to said open folds.

13. A sheet metal trough comprising a trough body having integral ends formed with open folds presenting upwardly and divergently inclined edges, and supports detachably connected to said ends each support consisting of a substantially upright panel having its upper edges bent over the edge of the adjacent end, inwardly directed side members engaged with the beads of said body, and a tongue carried by said panel disposed in interlocked relation to the opposite folds of the adjacent end of the trough.

14. A sheet metal trough structure comprising a trough body having integral ends formed with open folds presenting inclined complementary edges, and supports detachably connected to said ends each support consisting of a panel carrying integral means to interlock with the folds of the adjacent end of the trough body.

15. A trough comprising a body having end and side walls formed from a single piece of sheet metal, and supporting end panels each formed from a single piece of sheet metal, said body and end panels having integral interlocking means to secure the same together and said end panels having integral means assisting in preventing relative movement between the body and end panels and covering the top edges of the end walls of the body.

16. A trough comprising a sheet metal trough body having integral ends each formed with a plurality of folds lying adjacent to the end walls of the body and providing inclined edges, and supports for the end walls of the trough each support having means integral therewith and projecting between the folds of the adjacent end of the trough and cooperating with the inclined edges and the folds to carry the trough body and secure the body and support together.

17. A trough comprising a sheet metal trough body having integral ends each formed with a plurality of folds lying adjacent to the end walls of the trough, and vertical supports for the end walls of the trough each support having means projecting therefrom between the folds and the adjacent end of the trough without penetrating the metal of the folds or the trough and cooperating with the folds to carry the trough.

18. A trough comprising a body having side and end walls formed from a single piece of sheet metal and having its longitudinal edges bent over to form beads, and single piece metal supporting end panels each having an inturned flange along each of its vertical edges and interlocking with the beads of the body and having its top edge bent over the edge of the adjacent end wall of the body.

In testimony whereof we hereunto set our hands.

CARL G. NAYLOR.
GEORGE F. HAUF.